July 25, 1933. C. W. LEGUILLON 1,919,374
METHOD AND APPARATUS FOR FORMING ARTICLES OF PLASTIC MATERIAL
Filed Oct. 3, 1931
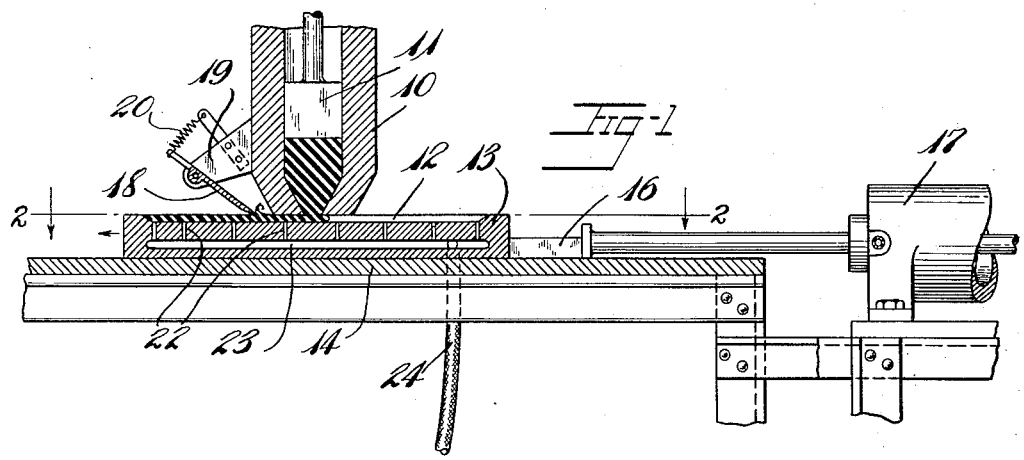
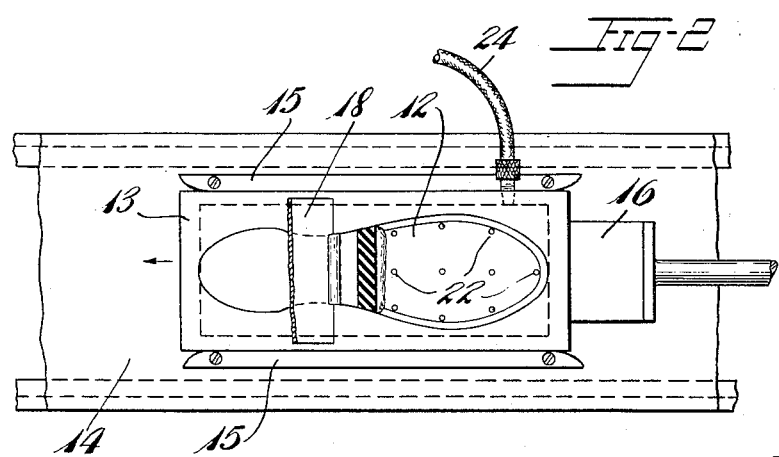
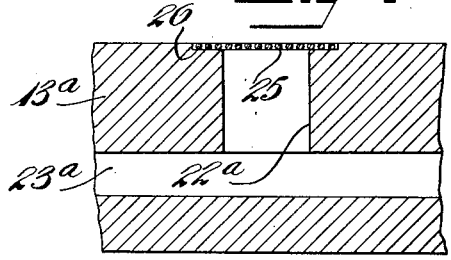
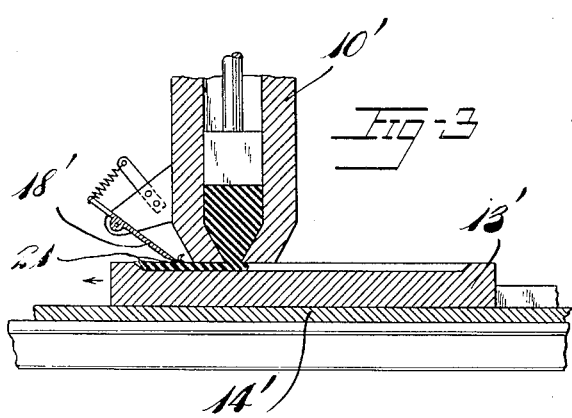
Inventor
Charles W. Leguillon
By Eakin + Avery
Attys Patented July 25, 1933

1,919,374

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

METHOD AND APPARATUS FOR FORMING ARTICLES OF PLASTIC MATERIAL

Application filed October 3, 1931. Serial No. 566,700.

This invention relates to apparatus for forming articles from plastic materials and more particularly to apparatus for forming the articles by relative movement of a cooperating old and extruding mechanism to effect mold filling by such movement.

In some cases it is found that on filling an open-cavitied mold by passage thereof entirely past the extruding mechanism, the stock in the mold has a tendency to move out of the cavity as it leaves the confinement of the extruding mechanism, due in part to the surface drag that is exerted on the surface of the stock by the contacting surface of the extruding means, and it is an object of this invention to provide for restraining such outward movement of the stock from the mold cavity. Further objects are to facilitate mold filling by providing for removing trapped air from the cavity during the extruding operation, and in general to facilitate efficient and rapid mold filling.

These and further objects will be apparent from the following description, reference being had to the accompanying drawing, in which:

Fig. 1 is a side view partly broken away and in section, of apparatus embodying the invention.

Fig. 2 is a view taken on the line 2—2 of Fig. 1.

Fig. 3 is a side view, partly broken away and in section, of apparatus over which that constructed according to the invention constitutes an improvement.

Fig. 4 is a fragmentary view, in vertical section through a suction aperture, of a modified mold constructed according to the invention.

In the illustrated embodiment of apparatus constructed according to the invention, referring to Figs. 1 and 2, an extruding device comprising a plastic stock containing chamber 10 is adapted by means of a plunger 11 to extrude stock through an orifice at its lower end into the open cavity 12 of a shoe sole mold member 13 as the latter is moved past the lower end of the chamber. The extruding device is mounted in fixed relation to a supporting platform 14, preferably with only sufficient space between the stock extruder and the platform to permit passage of the mold with its top surface close to the bottom of the extruder, and, in order to facilitate movement of the mold 13 over the platform and beneath the stock chamber, suitable guides 15, 15 are preferably provided on the surface of the platform. For moving the mold past the extruding means (right to left in the drawing) a suitable mechanism, such as a mold engaging ram 16 operated by a fluid pressure cylinder 17, may be provided.

Preferably there is provided at the rear of the extruding device a scraper blade 18, pivoted to a bracket 19 on the chamber 10 and resiliently urged into contact with the uppermost surface of the mold by a suitably mounted tension spring 20. This blade is adapted to scrape surplus stock from the upper surfaces of the mold and from the upper surface of the extruded stock.

It has been found that in apparatus as above described there is a tendency for the extruded stock to curl at its edge and to move upward as it is released from confinement beneath the extruding chamber by the movement of the mold past the rear edge of the chamber, especially where the mold cavity is shallow and extensive, as in the case of a mold for a shoe sole. This upward movement of the stock, or peeling of it from the bottom of the mold cavity, is illustrated at 21 in Fig. 3, wherein an open-cavitied mold 13 is shown in an intermediate position while being moved from right to left past an extruding device 10' while it is supported on a platform 14'.

Besides the likelihood of malformations in the final product resulting from this stock movement in the mold, the proper functioning of the scraper 18' is affected and there is danger of excessive and objectionable localized removal of the extruded stock.

According to the invention, provision is made for restraining this undesirable movement of the stock. To this end the mold is provided at the edges of the bottom of the mold cavity and preferably at spaced positions over the floor of the cavity, with a plurality of suction apertures 22, 22 leading into an internal recess or manifold 23 in the mold, from which recess air may be withdrawn through a suitable flexible connection 24 by any suitable suction means (not shown).

The apertures 22, 22 may be of such small cross section at the floor of the mold cavity that the stock, due to its sufficient viscosity, will not be forced objectionably into the apertures, or, as an alternative, the apertures may be formed larger in cross section, as indicated at 22a in the modification of Fig. 4, and a grating 25 provided at the mouth of the aperture to support the stock and to furnish a large suction area. The grating may be a metal screen of suitably small mesh, and it may be inset in a shallow recess 26 in the mold with its upper surface flush with the mold floor, and may be held in place by any suitable means, such as spot welding.

In operation, suction is applied to the mold floor through the apertures at spaced zones along its edges and over its area, as the mold is moved past the extruding device, and the extruded stock is held against the walls of the mold cavity with strong restraint against any tendency of the stock to curl at its edges or move out of the cavity as it is moved clear of the extruding device. The proper operation of the scraper blade is thus facilitated and a greater uniformity in the quality of the molded product is made possible.

As the rear end of the mold cavity passes beneath and becomes confined beneath the extruding device, the suction apertures in this region of the mold serve also to relieve the cavity of trapped air in advance of the entering stock as the mold is moved past the extruding device, and the extrusion of a homogeneous mass of the stock without porosity from pocketed air, is thus facilitated.

Variations may be made without departing from the scope of the invention as it is defined in the following claims.

I claim:

1. Apparatus of the class described comprising an open-cavitied mold member, means for extruding plastic stock into the mold cavity by relative movement of the mold member and extruding means, and means for maintaining suction at a wall of the mold cavity for restraining outward movement of the extruded stock from the mold cavity through the inlet opening of the latter during said relative movement of the mold member and extruding means.

2. Apparatus of the class described comprising an open-cavitied mold member, means for extruding plastic stock into the mold cavity by relative movement of the mold member and extruding means, said mold being formed with a plurality of apertures leading from a wall of the cavity, and means for applying suction to said apertures during said relative movement of the mold and extruding means.

3. Apparatus as defined in claim 2 including means in association with the suction apertures for restraining the stock from entering the apertures.

4. Apparatus of the class described comprising a cavitied mold member, means for extruding plastic stock into the mold cavity by relative movement of the mold member and extruding means, and means for progressively exhausting air in advance of the stock entering said cavity during said relative movement of the mold member and extruding means.

5. The method of forming an article of plastic material which comprises moving a cavitied mold past a supply mass of stock while maintaining the latter under pressure to cause it to flow into the mold cavity and holding the stock in the cavity by applying suction thereto through a wall of the cavity.

CHARLES W. LEGUILLON.